Figure 1:
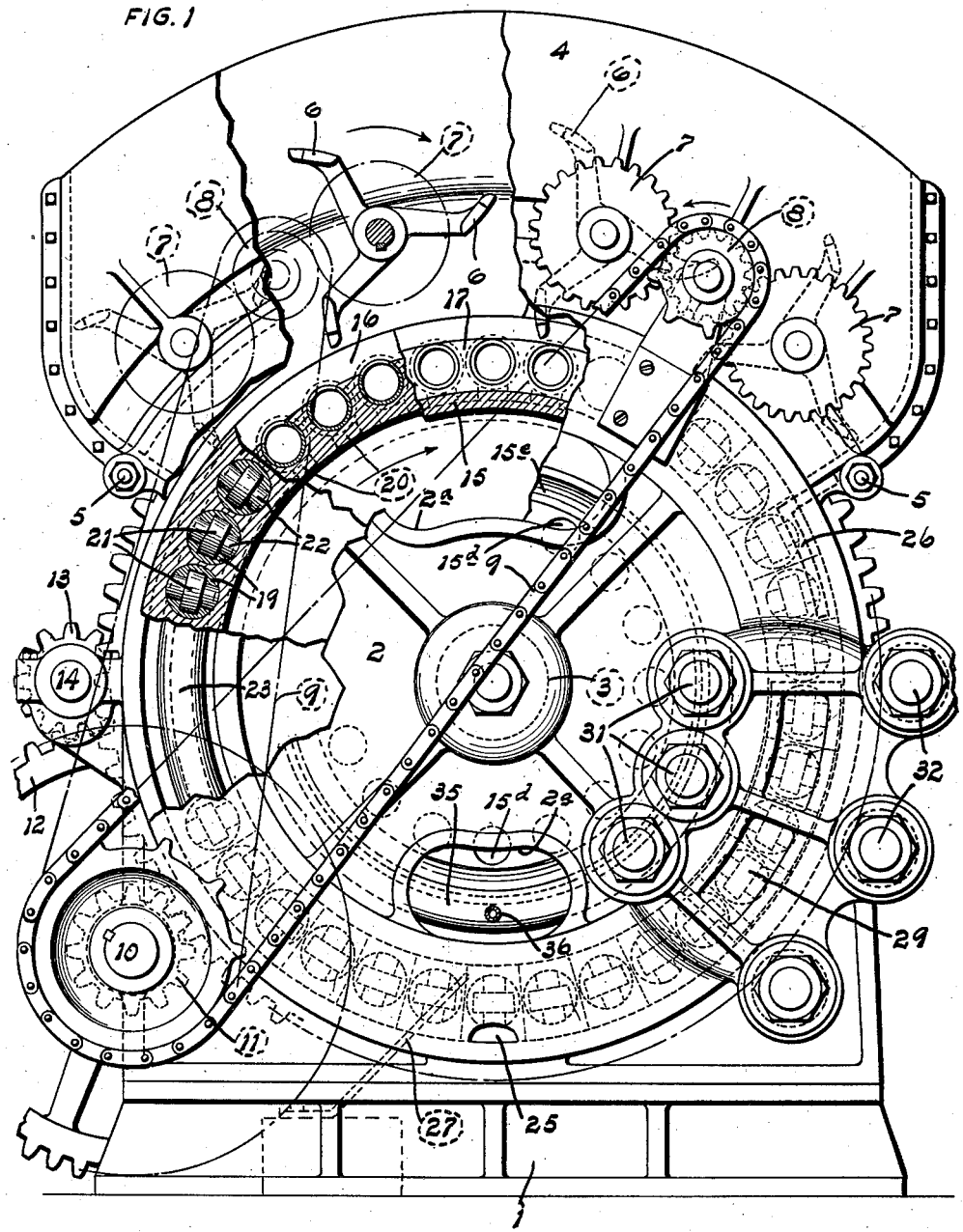

G. KOMAREK.
BRIQUET MACHINE.
APPLICATION FILED MAR. 23, 1911.

1,026,682.

Patented May 21, 1912.

3 SHEETS—SHEET 1.

WITNESSES

INVENTOR
GUSTAV KOMAREK
BY ATT'Y.

G. KOMAREK.
BRIQUET MACHINE.
APPLICATION FILED MAR. 23, 1911.
1,026,682.
Patented May 21, 1912.
3 SHEETS—SHEET 2.
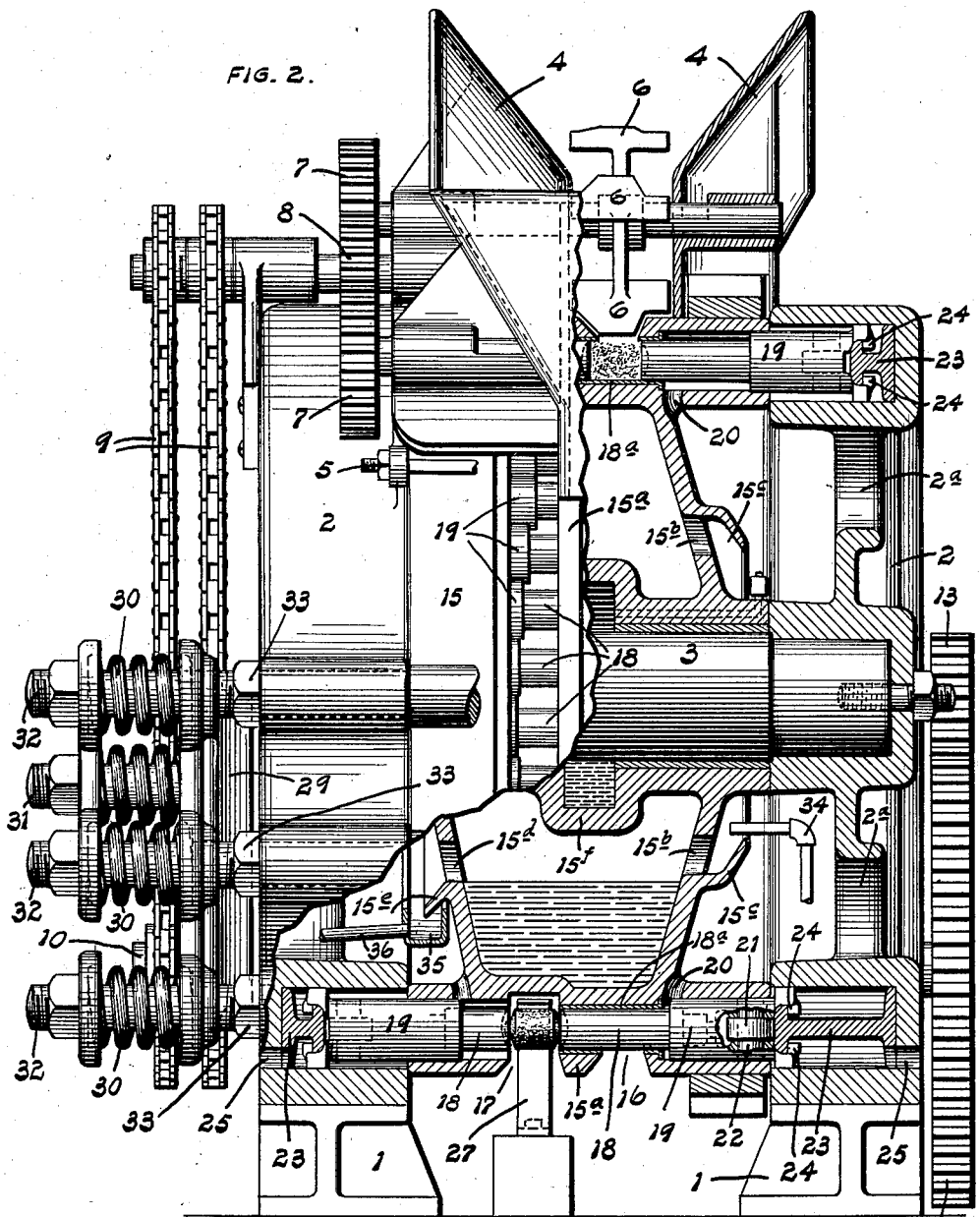
FIG. 2.
FIG. 3.
FIG. 4.
WITNESSES
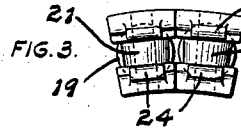
INVENTOR
GUSTAV KOMAREK
BY F. R. Cornwall, ATT'Y G. KOMAREK.
BRIQUET MACHINE.
APPLICATION FILED MAR. 23, 1911.
1,026,682.
Patented May 21, 1912.
3 SHEETS—SHEET 3.
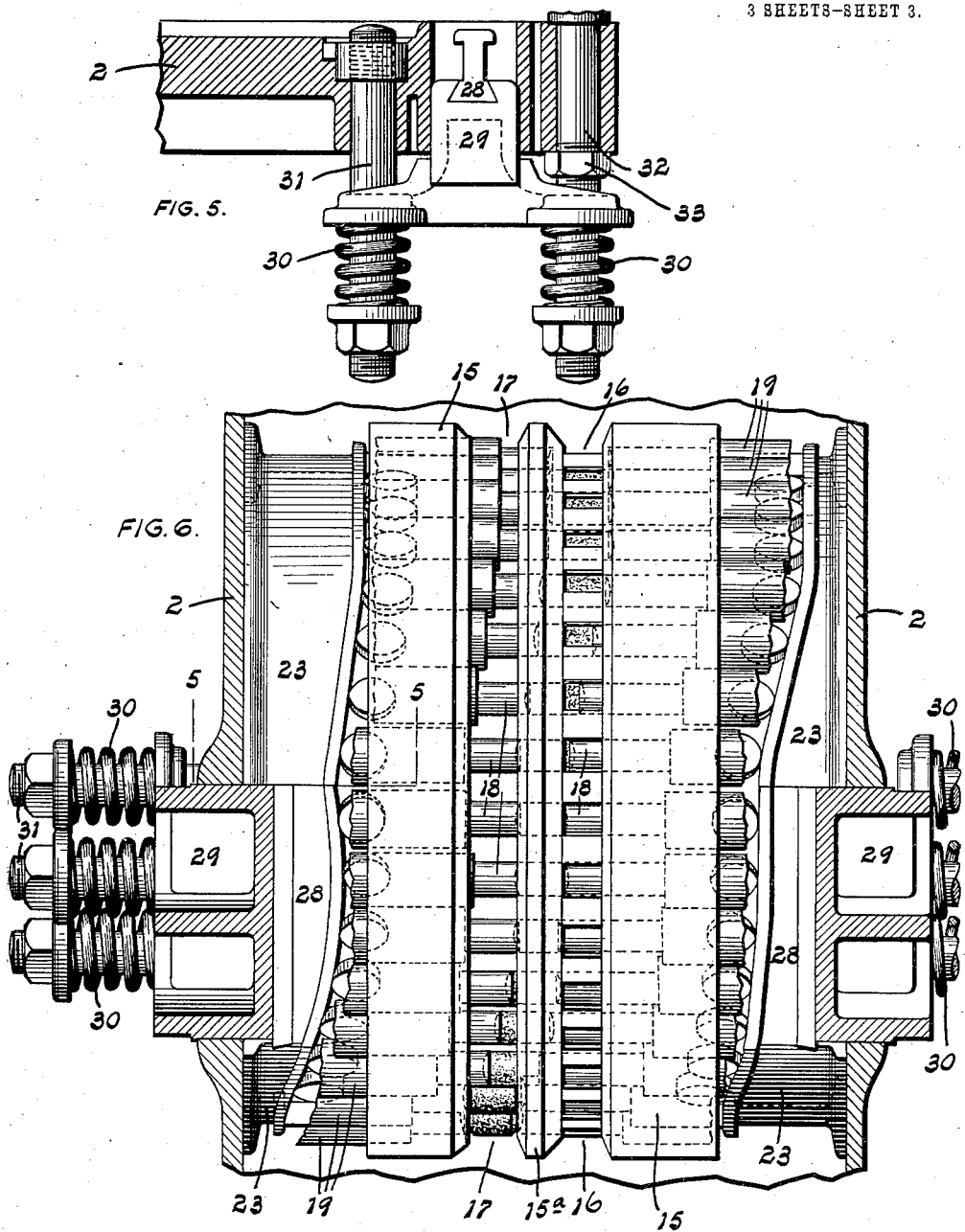
WITNESSES
INVENTOR
GUSTAV KOMAREK

UNITED STATES PATENT OFFICE.

GUSTAV KOMAREK, OF ST. LOUIS, MISSOURI, ASSIGNOR, BY DIRECT AND MESNE ASSIGNMENTS, TO ST. LOUIS BRIQUETTE MACHINE COMPANY, A CORPORATION OF MISSOURI.

BRIQUET-MACHINE.

1,026,682. Specification of Letters Patent. Patented May 21, 1912.

Application filed March 23, 1911. Serial No. 616,530.

*To all whom it may concern:*

Be it known that I, GUSTAV KOMAREK, a citizen of the United States, residing at St. Louis, Missouri, have invented a certain new and useful Improvement in Briquet-Machines, of which the following is a full, clear, and exact description, such as will enable others skilled in the art to which it appertains to make and use the same, reference being had to the accompanying drawings, forming part of this specification, in which—

Figure 1 is a side elevation, partly in section, of my improved briquet machine. Fig. 2 is an end elevation, partly in section, of said machine. Fig. 3 is an end view of two plungers. Fig. 4 is a sectional view through one of the plungers. Fig. 5 is a detailed view of the yielding section of one of the cams, taken on line 5—5 of Fig. 6. Fig. 6 is a side elevation of the plunger carrier.

This invention relates to a new and useful improvement in briquet machines; the object being to simplify the construction of machines of this character, to secure rigidity and strength, and obtain a large output.

With these objects in view the invention consists in the construction, arrangement and combination of the several parts, all as will hereinafter be described and afterward be pointed out in the claims.

In the drawings, 1 indicates base members, which may be anchored or secured in any suitable manner to a solid foundation, such as concrete, to which members are secured the side frames 2 of the machine; said side frames being in the form of castings and each having a blind bearing for receiving the ends of the main shaft 3; said shaft being held in position by a threaded stud extending through the side frames, the nut on the outer end of each stud forcing the side frames tightly against the shoulders of the main shaft.

The main shaft is intended to be held against rotation in the side frames. The upper portions of these side frames have bracket extensions to which the castings 4, constituting the feed box, are secured. These castings are bolted together at their end meeting edges, and the side frames are further secured by means of tie bolts 5, fastened through lugs on the side frames.

In the side walls of the feed box are formed bearings for shafts, said shafts carry agitating blades 6 whose outer edges are shaped so as to enter the feeding groove of the rotating mold carrier hereinafter described. On the ends of the agitator shaft are pinions 7, meshing with driving pinions 8, to which latter are joined sprocket wheels over which pass chains 9; said chains passing around sprockets mounted on the counter shaft 10. Shaft 10 has a pinion 11 mounted thereon for meshing with the teeth on the mold carrier and rotating the same; said shaft also has a gear 12 mounted thereon which meshes with a pinion 13 on the driving shaft 14. This driving shaft has a pulley (not shown) by which power is communicated to the machine.

15 is a mold carrier in the form of a hollow casting rotatably mounted upon the main shaft 3, and having transversely disposed openings on its marginal edge intersected by circumferential grooves, the first of which I shall designate as the filling opening 16, and the second as the discharge groove 17. The agitator blades 6 operate in the filling groove 16 and they, by their angularity, press the material in the feed box through the openings in the bottom of the filling groove and into the mold receptacle, said agitating blades rotating in the direction of the arrow Fig. 1 while the mold carrier moves in the direction of its arrow. The mold cavities are formed by the hardened steel bushing $18^a$, open at both ends and having a lateral outwardly disposed opening communicating with the feed groove 16 as shown. The feed groove 16 is preferably finished by turning the same, the lathe cutter carrying the cut to the depth of the inside diameter of the steel bushing to form the openings thereon, thereby leaving feather edges at the sides of the openings. 18 indicates plungers which are preferably mounted in plunger heads 19 by threaded reduced extension. In this manner when the inner ends of said plungers are worn, and it is desired to regrind them to form the concave faces used to round the ends of the briquet, the plungers may be removed, reground and washers or shims interposed between their shoulders and the plunger heads.

These plunger heads are larger than the plungers, and as the dirt and dust is liable to find its way into the enlarged chamber in which they are mounted, I provide openings 20 at the shoulders in the bores which receive said plungers.

Each plunger head is provided with an opening in its outer end for the reception of a roller 21 mounted upon a pin 22. This roller coöperates with the tread of a cam track 23 arranged in an inwardly opening concentric groove in the side framing. In addition to each plunger head having a roller which bears against the cam track, each plunger head has also hooked extensions 24 which embrace the flange of the cam track so that said plunger head can be retracted. These hooked extensions, as shown in Fig. 3, are substantially rectangular, having their inner and outer edges curved to conform to the curvature of the groove in the side framing, while their side edges are radial to their path of travel, whereby said plunger heads form an abutting concentric series, each plunger being independently horizontally movable, but restrained against independent rotation. At the bottoms of the grooves in which the cam tracks are mounted, are openings 25 through which dirt and dust in the cam groove may be removed.

The operation of the parts above described is briefly as follows: The material to be compressed into briquet form is forced into the mold cavities as the mold carrier moves under the feed box. The end of the feeding box is provided with a plate 26 which extends into the feeding groove 16 and thence downwardly some distance along the side of the groove as shown in Fig. 1 so as to hold the material in the mold cavities. As the mold carrier progresses, as shown in Fig. 6, the cam tracks force the plungers laterally in unison until the material is at the left hand end of the hardened bushing 17 which, as seen, is confined within the medial ring 15$^a$ of the mold carrier. When brought to this point, the rollers of the plungers pass from the stationary or fixed sections of the cam tracks and enter upon movable sections introduced into said cam tracks, as shown in Fig. 6. These movable sections aline with the fixed sections, the movable sections on one side (the right in Fig. 6) being slightly concave, and that (on the opposite side) being slightly convex so that the plungers at the right, which now close the feed openings, remain practically stationary while their companions are forced inwardly to compress the briquet. Immediately that the plunger reaches the highest point in its movable track, wherein the briquet is under the greatest compression, both it and its companion start to move leftwardly in unison, holding the briquet under such compression so as to move it laterally in the mold cavity, and impart a polish to the sides of the finished briquet. After compressing the briquet, both plungers leave the movable sections of the cam track and again ride upon the fixed sections and continue their leftward movement pushing the briquet into the discharge groove 17, at the lowermost point of the mold carrier in its revolution. At this point the plungers are caused to simultaneously recede so as to permit the briquet to drop; and to insure the removal of the briquets, a sweep arm 27, extends up into the discharge groove as shown in Figs. 1 and 2. The so called movable sections of the cam track are designated at 28, and, as shown in Fig. 5, are preferably keyed into the block 29, which block is provided with spring seats to coöperate with springs 30. These springs surround bolts 31 and 32. The bolts 31, which are nearest the center of the machine, are secured to the side framing; but the bolts 32, which are farthest from the center of the machine, act as through bolts to clamp the side frames of the machine together, their centers being enlarged so as to provide shoulders for the inner edges of the side frame pieces, while nuts 33 hold the side frame pieces against said shoulders. The block 29 limits the inward movement of the movable track section, and if the proper quantity of material is supplied to the mold cavity, the springs will not yield. These springs which hold the movable track sections inwardly are exceedingly strong, and in the event that the material is too densely packed into the mold cavities, they permit a slight yielding movement of the track sections outwardly to compensate for such increased density.

In order to keep the mold carrier cool, I make the same hollow as shown in Fig. 2, and provide openings 15$^b$ therein adjacent an inwardly extending flange 15$^c$ constituting a trough to receive water from a pipe 34. The opposite wall of the mold carrier is provided with openings 15$^d$ more distantly removed from the center of rotation so that the lowermost openings will be below the openings 15$^b$. The openings 15$^d$ permit the water in the lower part of the hollow mold carrier to overflow into the flange 15$^e$, whence it drops into a trough 35, and is conducted off through a pipe 36.

The hub of the mold carrier is provided with an oil chamber 15$^f$ at its center for the purpose of lubricating the bronze bushing forming the bearing upon the fixed shaft 3. An opening for supplying oil to this chamber leads to the exterior, and is preferably closed by a plug. Openings 2$^a$ are formed in the side framing to give access to this plug, and afford means for introducing oil into the chamber. Openings are also provided in the lower portions of the side framings for the introduction of the pipes 34 and 36.

From the above it will be noted that the machine is continuous in its operation, the material in the feed box being fed to the mold cavities in the carrier throughout about one third of its revolution: hence the cavities should be compactly filled to a uniform density. As the plungers enter the movable sections by the action of the cams, the material is under no compression; but said plungers are soon forced together so as to place the material under slight compression, after which time both plungers move to one side until the highest point on the convex and the lowest point on the concave side is reached to give the greatest compression, after this the plungers start to move in opposite directions. Only two briquets receive the maximum pressure at a time, and are moved in opposite directions at the same time. This relieves the housing of side stresses, and places a highly polished surface on the briquet due to the movement of the material while under compression. The briquets are partly in the discharge groove before the plungers leave the movable sections of the cams, and one cam continues to force the briquet into the discharge opening, while the opposite cam withdraws the companion plunger at a faster rate of speed to make room for the briquet which is being discharged.

I claim:

1. In a briquet machine, the combination of a feed box, a mold carrier having a feed groove in its periphery and forming the bottom of the feed box, and a mold carried by said carrier extending transversely below and opening outwardly into the bottom of the feed groove through an opening of less width than the diameter of the mold.

2. In a briquet machine, the combination of a feed box, a revoluble mold carrier forming the bottom of said box, sectional flights in said box, said mold carrier having a feed groove in its periphery, transversely disposed molds of capacity to hold material for a single briquet extending across and opening outwardly through the bottom of said feed groove, and oppositely movable plungers in said molds.

3. In a briquet machine, the combination of a feed box, a revoluble mold carrier forming the bottom of said box, said mold carrier having a feed groove in its periphery communicating with said box, and also a discharge groove in its periphery which is located to one side of said box, and molds in said carrier which extend across and open outwardly through the bottom of the feed groove and laterally into the discharge groove, the portion of said molds lying below said feed groove having a capacity for material for a single briquet.

4. In a briquet machine, the combination of a feed box, a revoluble mold carrier forming the bottom of said box, said mold carrier having a feed groove in its periphery in communication with the feed box, and also a discharge groove relatively deeper than said feed groove and which discharge groove is located to one side of the feed box, molds in the mold carrier which communicate with the bottom of the feed groove, and laterally with the discharge groove by means of openings through the walls of the molds of less width than the diameter of the molds, opposite movable plungers, and a means for moving said plungers laterally.

5. In a briquet machine, the combination of a feed box, a mold carrier forming the bottom of said box, said mold carrier having a feed groove communicating with the box and molds having capacity for the material of one briquet extending transversely below the feed groove and communicating outwardly therewith, and angular flights arranged in the feed box and extending down into the feed groove so as to sweep the material therein down into said molds.

6. A mold carrier for briquet machines having transversely disposed mold cavities, feed openings leading thereunto which are smaller than the area of the cavity, said mold carrier having a discharge groove into which said mold cavity communicates, and said discharge groove being larger than the area of said cavity.

7. In a briquet machine, the combination of a hollow mold carrier having openings in its side walls, the openings on one side being farther from the center than those on the opposite side, an inwardly extending flange surrounding the first mentioned openings and an outwardly extending flange around the openings which are located farthest from the center, a trough for catching water overflowing from said last mentioned openings, and a pipe for supplying water to the opposite openings.

8. In a briquet machine, the combination of a mold carrier having a differential bore, a differential plunger mounted to register in said bore, and an opening leading from the shoulder in the differential bore for the exit of dirt and dust.

9. In a briquet machine, the combination of a mold carrier having a concentric series of transversely disposed mold cavities therein, plungers arranged in said mold cavities, said plungers having flanged heads, adapted to coact with one another, the flanges of said heads permitting independent longitudinal movement of the plungers but preventing independent rotation thereof.

10. A briquet machine comprising a mold wheel, a peripheral feed groove formed in the mold, a feed box over said groove, molds extending transversely of said mold wheel in a circumferential series under the feed groove, the line of the bottom of said feed groove passing through the upper half of the circumferences of said molds.

In testimony whereof I hereunto affix my signature in the presence of two witnesses, this 14th day of March, 1911.

GUSTAV KOMAREK.

Witnesses:
M. P. SMITH,
E. M. HARRINGTON.

Copies of this patent may be obtained for five cents each, by addressing the "Commissioner of Patents, Washington, D. C."